US009073392B2

(12) United States Patent
Orlewski

(10) Patent No.: US 9,073,392 B2
(45) Date of Patent: Jul. 7, 2015

(54) METHOD OF TREAD WEAR SENSOR INSTALLATION IN A TIRE

(71) Applicant: The Goodyear Tire & Rubber Company, Akron, OH (US)

(72) Inventor: Piotr Orlewski, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 173 days.

(21) Appl. No.: 13/912,311

(22) Filed: Jun. 7, 2013

(65) Prior Publication Data

US 2014/0360256 A1    Dec. 11, 2014

(51) Int. Cl.
G01L 7/00       (2006.01)
B60C 11/24      (2006.01)

(52) U.S. Cl.
CPC .................................. *B60C 11/243* (2013.04)

(58) Field of Classification Search
None
See application file for complete search history.

(56) References Cited

U.S. PATENT DOCUMENTS

| 5,502,433 | A | * | 3/1996 | Breuer et al. | 340/438 |
|---|---|---|---|---|---|
| 5,749,984 | A | * | 5/1998 | Frey et al. | 152/415 |
| 5,864,056 | A | * | 1/1999 | Bell et al. | 73/146 |
| 5,964,265 | A | * | 10/1999 | Becherer | 152/152.1 |
| 6,220,319 | B1 | * | 4/2001 | Reuter | 152/152.1 |
| 6,289,958 | B1 | * | 9/2001 | Dheur et al. | 152/152.1 |
| 7,249,620 | B2 | | 7/2007 | Croissant et al. | 152/154.2 |
| 7,284,417 | B2 | | 10/2007 | Reynolds | 73/146.5 |
| 7,404,318 | B2 | * | 7/2008 | Merino-Lopez et al. | 73/146 |
| 7,404,319 | B2 | | 7/2008 | Poulbot et al. | 73/146.5 |
| 7,604,029 | B2 | | 10/2009 | Myatt | 152/154.2 |
| 7,832,439 | B2 | * | 11/2010 | Ikeda et al. | 152/209.16 |
| 8,061,191 | B2 | | 11/2011 | Hanatsuka | 73/146 |
| 8,332,092 | B2 | * | 12/2012 | Laermer et al. | 701/29.1 |
| 8,493,200 | B2 | * | 7/2013 | Wakao et al. | 340/442 |
| 8,555,940 | B2 | * | 10/2013 | Murata | 152/209.8 |
| 8,754,158 | B2 | * | 6/2014 | Hattori et al. | 524/399 |
| 8,794,058 | B2 | * | 8/2014 | Bigot et al. | 73/146 |
| 2004/0154715 | A1 | | 8/2004 | Dufournier | 152/154.2 |
| 2008/0223495 | A1 | * | 9/2008 | Ikeda et al. | 152/209.16 |

FOREIGN PATENT DOCUMENTS

| DE | 19745734 | | 4/1999 | B60C 11/24 |
|---|---|---|---|---|
| EP | 1798070 | A1 | 6/2007 | B60C 11/24 |
| EP | 1798071 | | 6/2007 | B60C 11/24 |
| JP | 1307526 | | 12/1989 | F16D 66/02 |
| JP | 2005028950 | | 2/2005 | B60C 11/24 |
| JP | 2005028950 | A * | 2/2005 | |

OTHER PUBLICATIONS

European Search Report received by Applicant Aug. 14, 2014.

* cited by examiner

*Primary Examiner* — Peter Macchiarolo
*Assistant Examiner* — Jermaine Jenkins
(74) *Attorney, Agent, or Firm* — Richard B. O'Planick

(57) ABSTRACT

A method of installing a tread wear sensor in a tire includes configuring multiple tread wear indicators to each include a stack of sacrificial resistive sensor elements. The stacks of resistive sensor elements are affixed to respective selected tread lugs positioned at dispersed axial locations across a tire tread region. The resistive sensor elements sacrificially abrade and a change in resistance in each stack is measured. Connector assemblies within the tire carcass cavity are positioned radially opposite the selected tread lugs. A needle projection from each of the connector assemblies is inserted radially outward through the tire carrying leads which engage and establish electrical contact with a respective stack of resistive sensor elements.

15 Claims, 13 Drawing Sheets

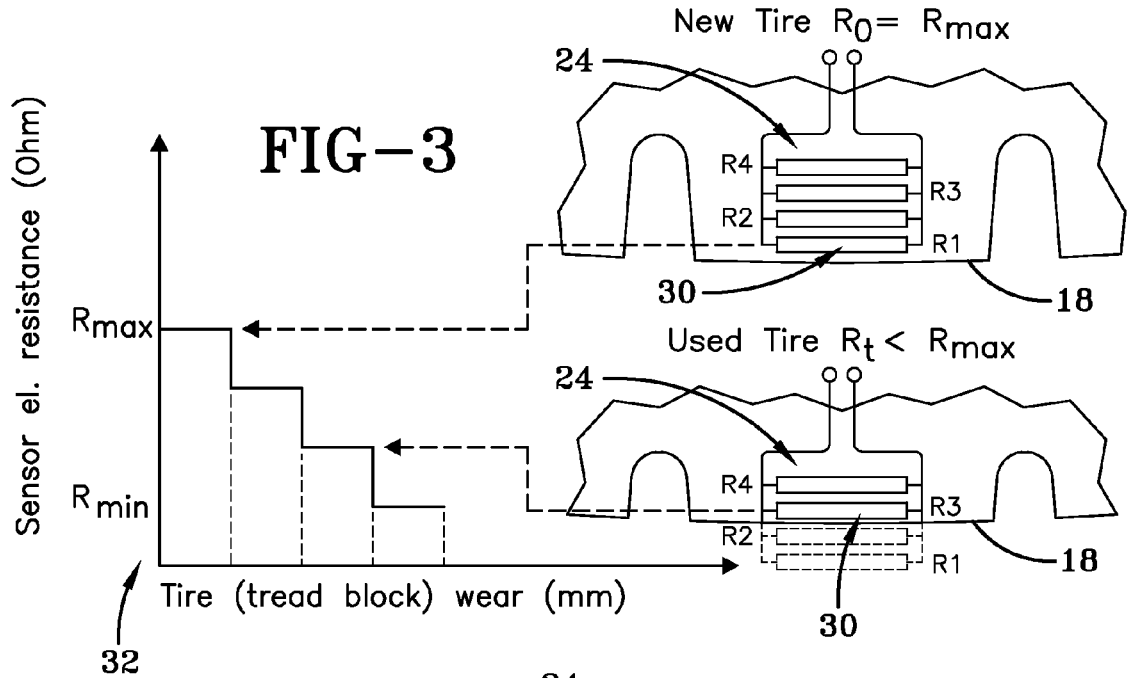
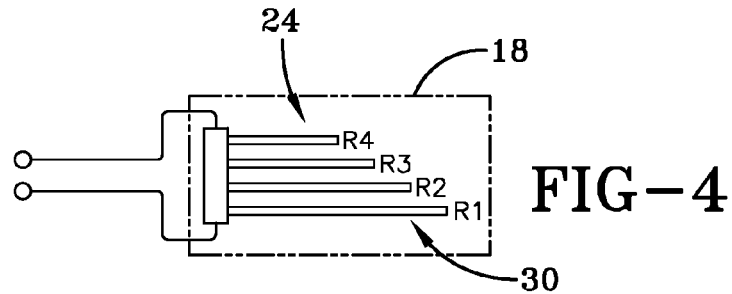
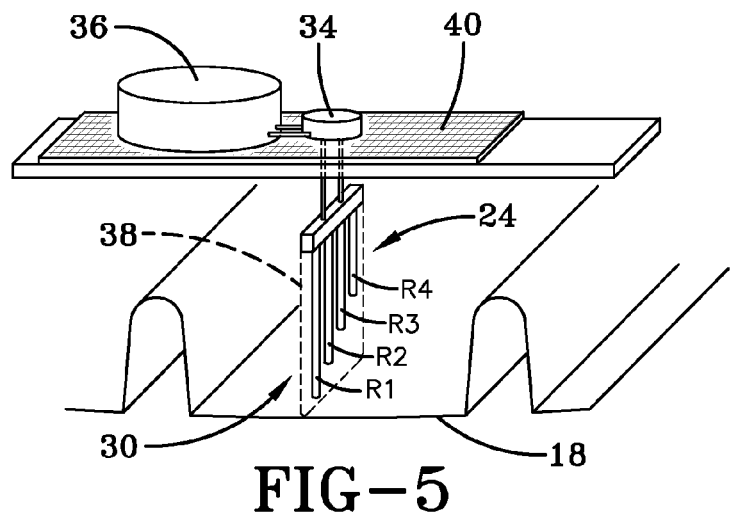

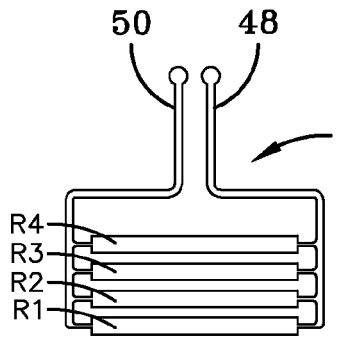 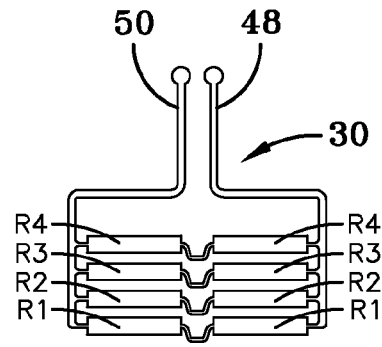 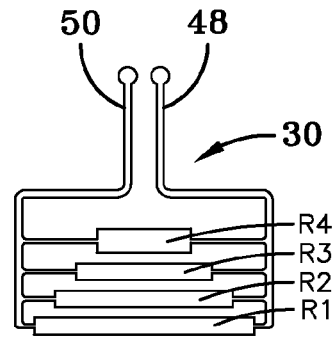
FIG-6A    FIG-6B    FIG-6C
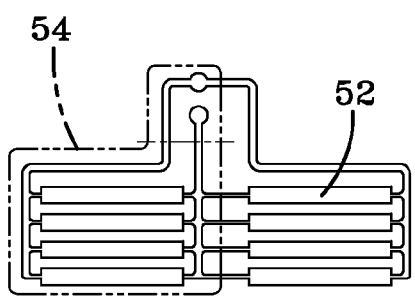 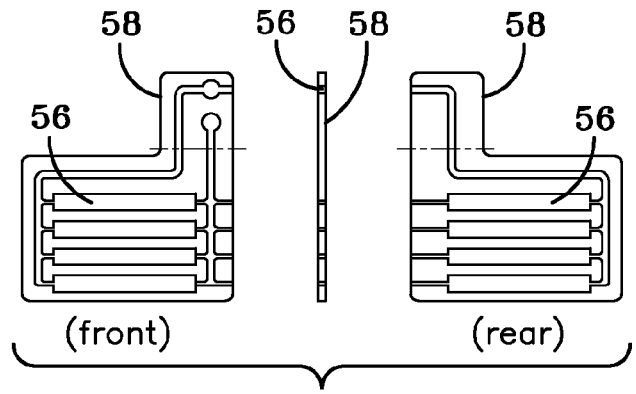
FIG-7A    FIG-7B
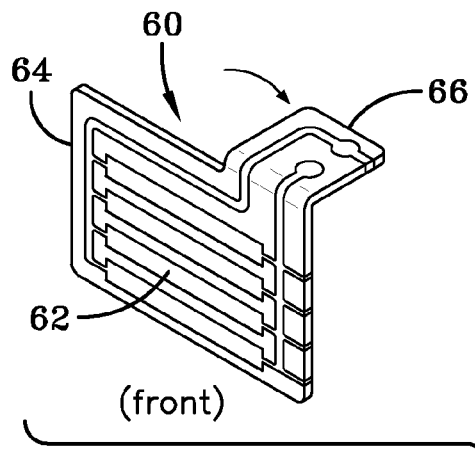 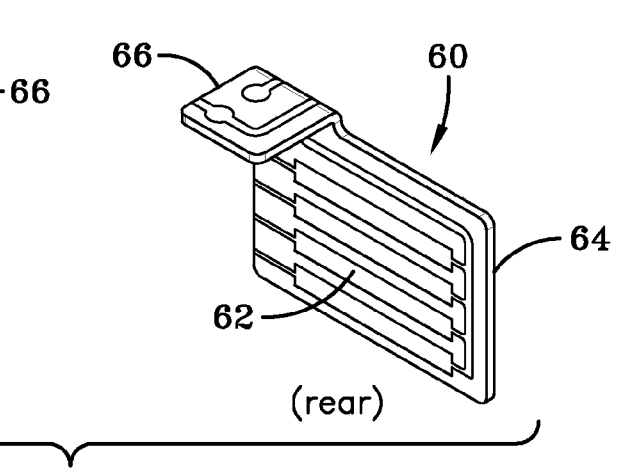
FIG-7C

METHOD OF TREAD WEAR SENSOR INSTALLATION IN A TIRE

FIELD OF THE INVENTION

The invention relates generally to a sensing system for real-time monitoring of tire wear over its life time and, more specifically, to a method of installing a wear sensor into a tire.

BACKGROUND OF THE INVENTION

The use of tread wear indicators is not new and the use of tread wear indicators is mandated by law in many countries. A variety of such indicators are known. Once such type employs colored indicia below the tread for a visual indicator of wear. Other types use tie-bar type elements in the tread grooves.

The practical problem with the colored indicators of the type mentioned is that there is no way for the operator to determine the level of wear until the tire is worn. When the tire employs the tie-bar type wear indicator, it can be difficult to determine the level of wear.

U.S. Pat. No. 6,523,586 discloses wear indicators for a tire tread wherein, in a series, or predetermined closely located grouping, of related marks, the marks disappear as the tire is worn. While this provides continuous information to the consumer, the complexity of forming the tire is increased due to the need to form multiple different marks that appear only after a defined amount of wear.

A tread wear indicator which is readily integrated into a tire and which reliably measures tread wear in a manner easily monitored by a vehicle operator is, accordingly, desired and heretofore unattained.

SUMMARY OF THE INVENTION

According to an aspect of the invention a method of installing a tread wear sensor in a tire includes configuring tread wear indicators to each include a stack of sacrificial resistive sensor elements. The stacks of resistive sensor elements are affixed to respective selected tread elements (lugs) positioned at dispersed axial locations across a tire tread region. Each stack of resistive sensor elements is oriented parallel to a ground engaging surface of a respective tread lug with each resistor sensor element at a respective sensor depth from the ground engaging surface. The sensor elements sacrificially abrade and change in resistance responsive to progressive tread wear on the tread element to the sensor depth.

In another aspect, the method includes measuring the resistive sensor elements of each stack for a change in resistivity; and determining a tread wear status profile based on the measured change in resistivity of the resistive sensor element in each stack.

According to another aspect of the invention, the method of affixing the resistive sensor elements of each tread wear indicator to a tread element includes dividing a tread lug into opposed tread element blocks by an axially extending incision; spreading the opposed tread element blocks apart; affixing a stack of resistive sensor elements to a channel-facing surface of a tread element block; and converging the tread element blocks together to eliminate the channel therebetween. The circuit including the stack of resistive sensor elements may be etched onto a substrate for insertion into the tread lug channel or, alternatively, etched to a channel-facing surface of one of the divided lug tread element blocks.

The method, in a further aspect of the invention, includes positioning multiple connector assemblies within the tire carcass cavity radially opposite the selected tread lugs. A needle projection from each of the connector assemblies is inserted radially outward through the tire carcass from a tire cavity side. The needle projection extends to a position opposite a respective stack of resistive sensor elements and carries conductive leads which engage and establish electrical contact with the respective stack of resistive sensor elements.

Definitions

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "sipe". The slot typically is formed by steel blades inserted into a cast or machined mold or tread ring therefore. In the appended drawings, slots are illustrated by single lines because they are so narrow. A "sipe" is a groove having a width in the range from about 0.2 percent to 0.8 percent of the compensated tread width, whereas a "narrow groove" has a width in the range from about 0.8 percent to 3 percent of the compensated tread width and a "wide groove" has a width greater than 3 percent thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide groove are of substantially reduced depth as compared to wide circumferential grooves which they interconnect, they are regarded as forming "tie bars" tending to maintain a rib-like character in the tread region involved.

"Inner" means toward the inside of the tire and "outer" means toward its exterior.

"Outer" means toward the tire's exterior.

"Radial" and "radially" are used to mean directions radially toward or away from the axis of rotation of the tire.

"Tread" means a molded rubber component which, when bonded to a tire casing, includes that portion of the tire that comes into contact with the road when the tire is normally inflated and under normal load. The tread has a depth conventionally measured from the tread surface to the bottom of the deepest groove of the tire.

"Tread Element" is a protruding portion of a tread such as a lug or rib which constitutes the element that comes into contact with the road.

BRIEF DESCRIPTION OF THE DRAWINGS

The invention will be described by way of example and with reference to the accompanying drawings in which:

FIG. 3 is a graph showing sensor resistance vs. tire wear.

FIG. 4 is a schematic drawing of parallel resistor electrodes in tread block.

FIG. 5 is a perspective view of parallel resistors in a tread block.

FIGS. 6A through 6C are schematic views of alternative sensor patterns showing in FIGS. 6A and 6B like-sized resistive elements and, in FIG. 6C, different sized resistive elements.

FIGS. 7A through 7C are schematic views of alternative stacked pattern layouts of two full sensors showing how the sensors would be etched onto an insulator layer with the contact area being formed over at 90 degrees.

DETAILED DESCRIPTION OF THE INVENTION

Figure 1:
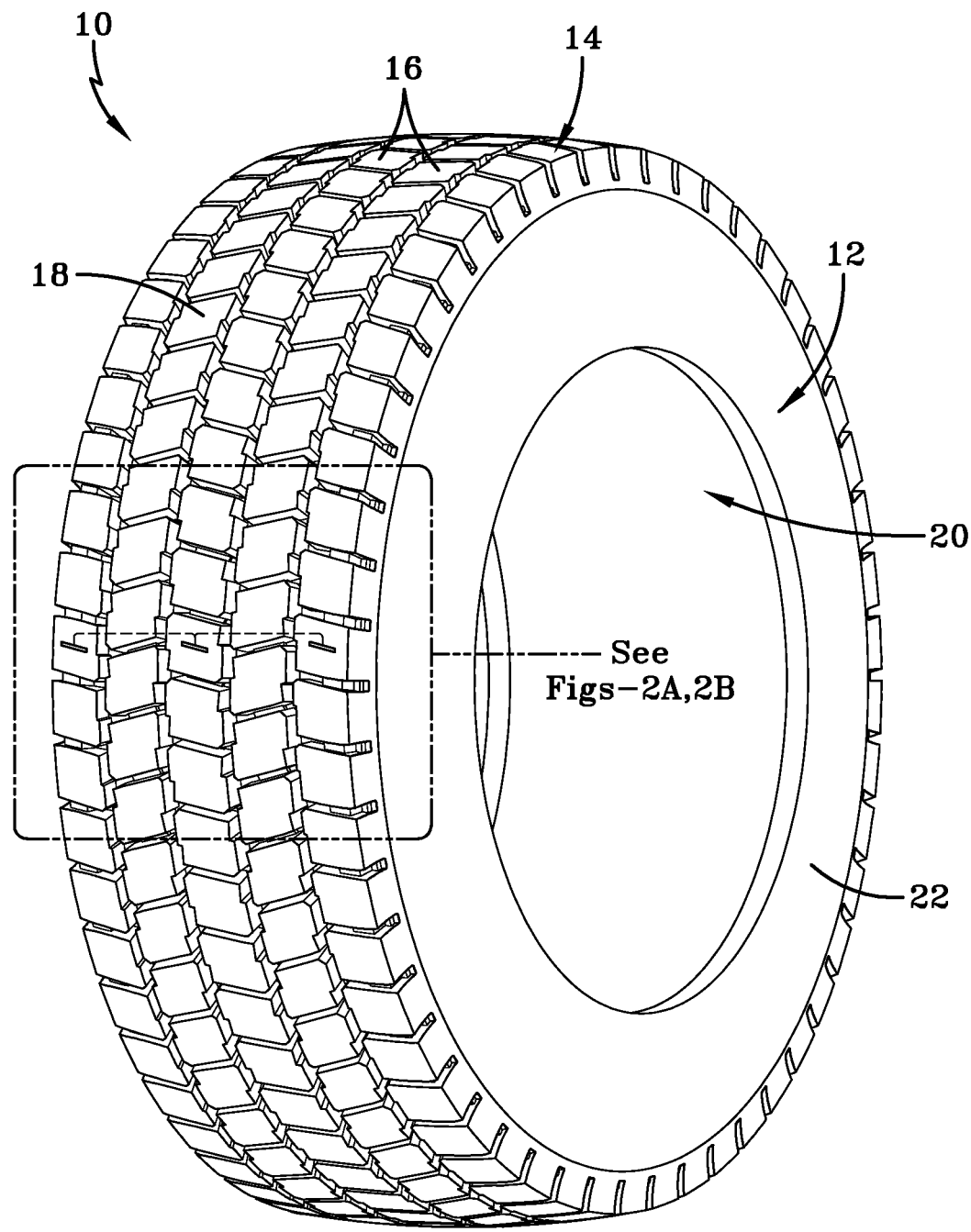
FIG. 1 is a perspective front view of a tire showing the sensor location.
Figure 2A:
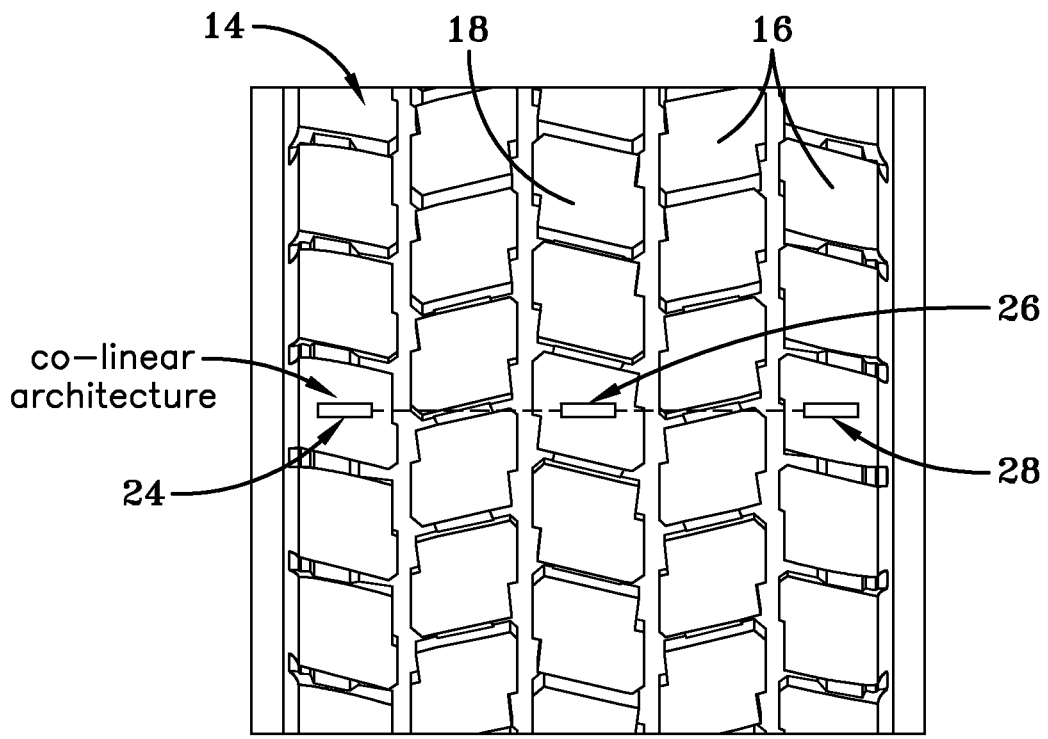
FIGS. 2A and 2B are enlarged fragmented front views taken from FIG. 1 showing sensor locations.
Figure 2B:
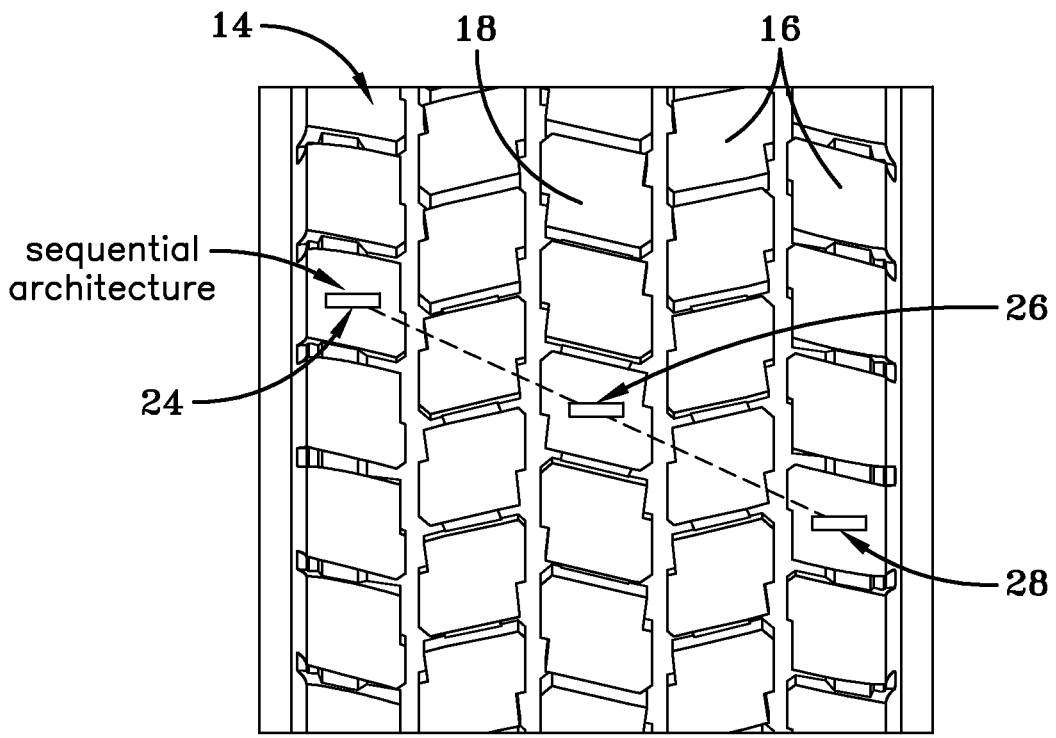

Referring to FIGS. 1, 2A and 2B, a representative tire assembly 10 is shown including a vehicle tire 12 having a radially outward tread 14 defined into multiple circumferential tread rows 16. Within each of the tread rows 16 is a circumferential array of tread elements 18, also referred to herein as tread lugs or blocks. The tire 12 further includes an internal cavity 20. Pursuant to conventional tire construction, the tire 12 is formed as a tire carcass 22 in a green tire build procedure and subsequently cured into the finished tire product.

FIGS. 2A and 2B show enlargement views of the tread region, illustrating the tread rows 16 formed by the spaced apart tread blocks 18. At least one of the tread blocks 18, and preferably multiple tread blocks, are equipped with a resistive sensor 24, also referred herein as a "wear sensor" or "tread-wear indicator". As seen in the sensor configuration of FIG. 2A, the tread lugs 18 equipped with wear sensors 24, 26 and 28 are lugs which lie in a co-linear axial alignment across the tread 14. In FIG. 2A, an alternative wear sensor architecture is depicted in which the sensors 24, 26, 28 lie in a sequential or diagonal array across the tread 14. The purpose of the sensors 24, 26, 28 is to detect the progressive wearing of the tread lugs 18 to which the sensors are attached in order to monitor the general tread wear of the tire. By monitoring tread wear, the wear status of the tire may be ascertained. From determining the wear status of the tire, a decision on whether and when to replace the worn tire may be made.

With reference to FIGS. 3, 4 and 5, the principle by which the tread war sensors 24 operate will be understood. The sensors 24 are constructed having an array 30 of resistor elements. In the embodiment shown, four resistor elements R1, R2, R3 and R4 are shown but it will be appreciated that more or fewer resistors may be employed if desired. The resistors are positioned in parallel at differentiated radial depths along a tread block 18 to which the resistors are secured. The resistors progressively wear out as the tread block 18 wears, causing a measurable change (drop) in the measured electrical resistance R of the array 30. When multiple tread blocks are so fitted with resistor arrays, such as two or three blocks, at different locations in the tread, the wear status of the tread at the selected tread locations may be ascertained by detecting and measuring the drop in resistance R of each array.

A micro-processor processes the data from the tread blocks fitted with resistor arrays. Upon application of an algorithm to the data, a tire wear estimation is made. If the tire is equipped with an in-tire tire pressure monitoring system (TPMS) which transmits tire pressure data from a TPMS pressure sensor, the TPMS system may be employed for the additional purpose of at least detecting data from the resistor sensors 24, 26, 28 and transmitting the data by radio-frequency signal to a remote receiver.

FIG. 3 shows a representative wear sensor 24 in a new tire lug 18 which is unworn. It will be seen that all four resistor lines R1, R2, R3 and R4 in array 30 are positioned in parallel and provide a cumulative resistance Rmax. For a new tire, R0-Rmax. The graph 32 of sensor resistance (ohms) vs. tire tread block wear (mm) illustrates the wear detection principle as the tire tread lug 18 wears. As the lug wears, resistor lines progressively wear and are eliminated. A drop in resistance R from the array 30 results. The diagram in FIG. 3 of a used tire shows an elimination of resistors R1 and R2 as the lug 18 wears away. As a consequence Rt of the array 30<Rmax. Further wear on the lug will progressively eliminate resistor lines R3 and R4, reducing Rt.

FIG. 4 is a schematic drawing of the array 30 of parallel resistor elements R1, R2, R3 and 4 in tread block 18. FIG. 5 is a perspective view of the parallel resistors in the tread block 18. The resistor elements or electrodes may be screen printed on a film substrate 38. For example, the resistors may be on 45 micrometer thick film and silver ink recovered with carbon ink used to print the circuitry thereon by techniques common in the industry. It is further contemplated that through the use of a suitable substrate, such as Kapton® plastic material, the substrate in the wear sensor 24 will be capable of withstanding the temperatures imposed during tire cure. Consequently, it is possible through appropriate selection of materials to incorporate the resistor sensor 24 into a tread block 18 of a green tire during green tire build. As shown schematically in FIG. 5, the system employs a through-belt snap-in connector 34 to establish electrical connection between the wear sensor resistors and a TPMS sensor module 36. The TPMS module 36 is designated as "TPMS+" to represent that the TPMS module 36, in addition to measuring and transmitting pressure data from the tire cavity, may also be employed to transmit data from the wear sensor to a remote receiver. It will be noted that the TPMS +module 36 mounts to the cavity side surface of the tire carcass such as the tire inner liner. It will further be noted that the connector 34 is deployed through the tire carcass from the cavity side. The connector 34 projects through the carcass belt reinforcement 40 and includes electrical leads which establish electrical engagement with the resistor array 30 as will be explained below.

The resistor elements R1, R2, R3, R4 constituting the array 30 may be configured in multiple patterns as reflected in FIGS. 6A, 6B and 6C. In FIG. 6A, the resistors are arranged in a single row pattern. In FIG. 6B, the resistors are in a double row pattern. In FIG. 6C, the resistors are in a single row pattern in mutual differentiated sizes so that each resistor carries and may be identified by a unique resistive value (ohm). The different resistive values of elements R1, R2, R3 and R4 assist in identifying change in Rt as the tire lug wears and thereby the wear status of the lug 18.

FIGS. 7A through 7C are schematic views of alternative stacked pattern layouts of two full sensors. FIG. 7A shows a full sensor layout 52 etched to an isolation layer pattern 54. FIG. 7B shows a stacked configuration in front, back, and side elevation views of the etched sensor 56 on the isolation layer 58. FIG. 7C shows a configuration in which "flip-flop" contacts 60 are utilized. The contacts 60 have etched resistor sensor circuitry 62 integrated into isolation layers 64. The contacts 60 provide connector wings 66 extending perpendicular to the plane of the isolation layer 64 and parallel to a tread block plane. The wings 66 are configured as contact pads so as to maximize the "blind" contact area available to a thru-belt snap-in connector explained following. The sensor front and rear views are shown in FIG. 7C.

Figure 8A:
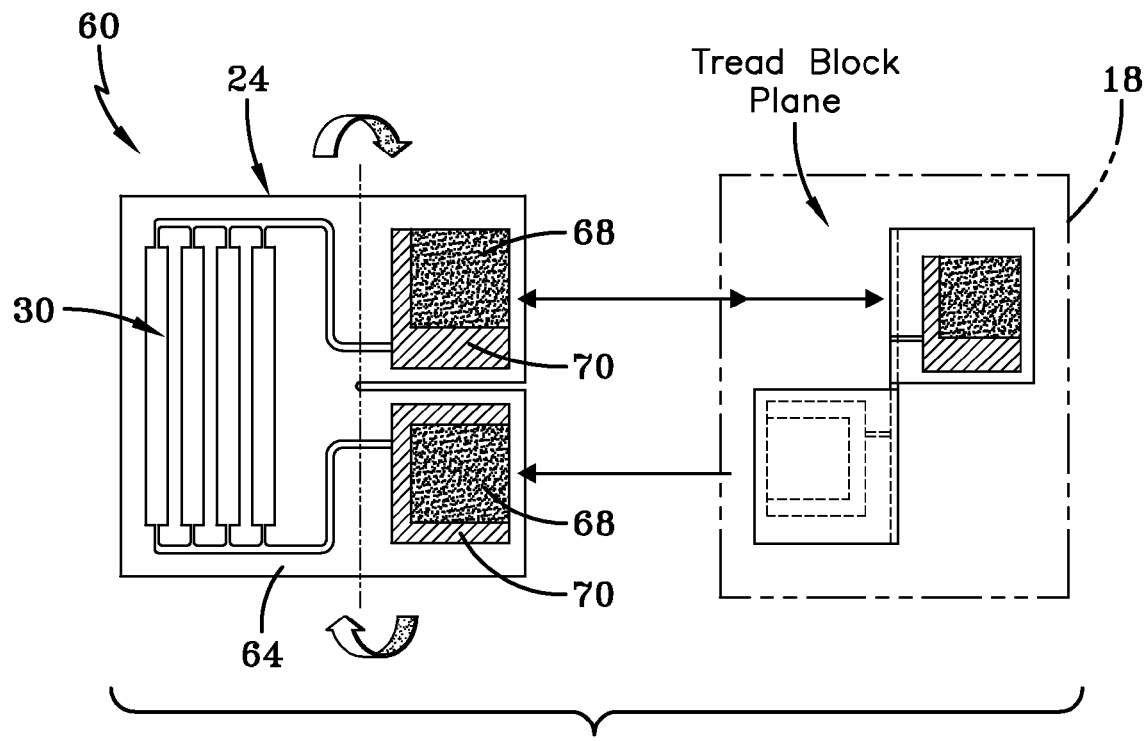
FIGS. 8A and 8B are schematic view showing a "Flip-Flop" layout, in which a formed finished sensor is located in a tread block.
Figure 8B:
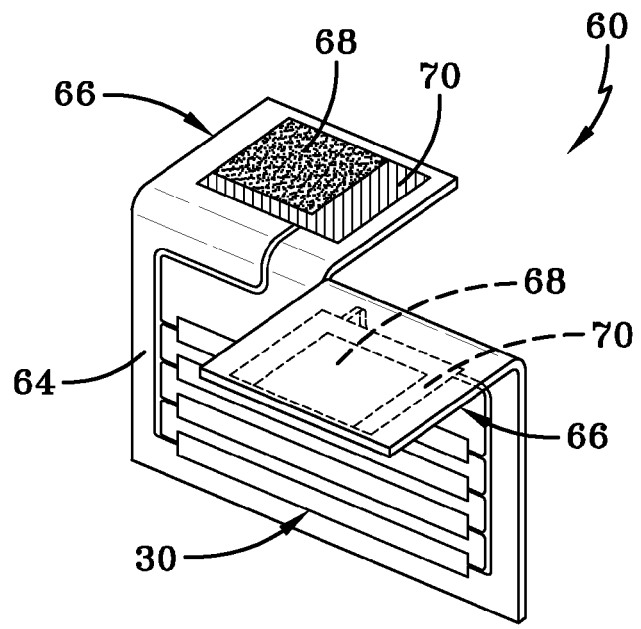

Referring to FIGS. 8A and 8B, the 'flip-flop" sensor contact 60 configuration is shown in greater detail. The wings 66 the sensor layout define a contact area formed over at 90 degrees from the body of the sensor containing the resistive array 30. In the "flip-flop" sensor configuration 60, the resistor array 30 extends radially (direction arrow 69 in FIG. 9) within a tread lug 18. The contact wings 66 are formed ninety degree over and position at a radially inward end of the lug 18. The wings 66 carry a rubber conductive cap 68 bonded to an isolation layer 70. Leads from the resistor array 30 electrically connect to the conductive cap 68. So positioned, the wings 66 are diagonally separated and project in opposite axial directions (direction arrow 71 in FIG. 9), ninety degrees over from the radially extending body of the sensor.

Figure 9:
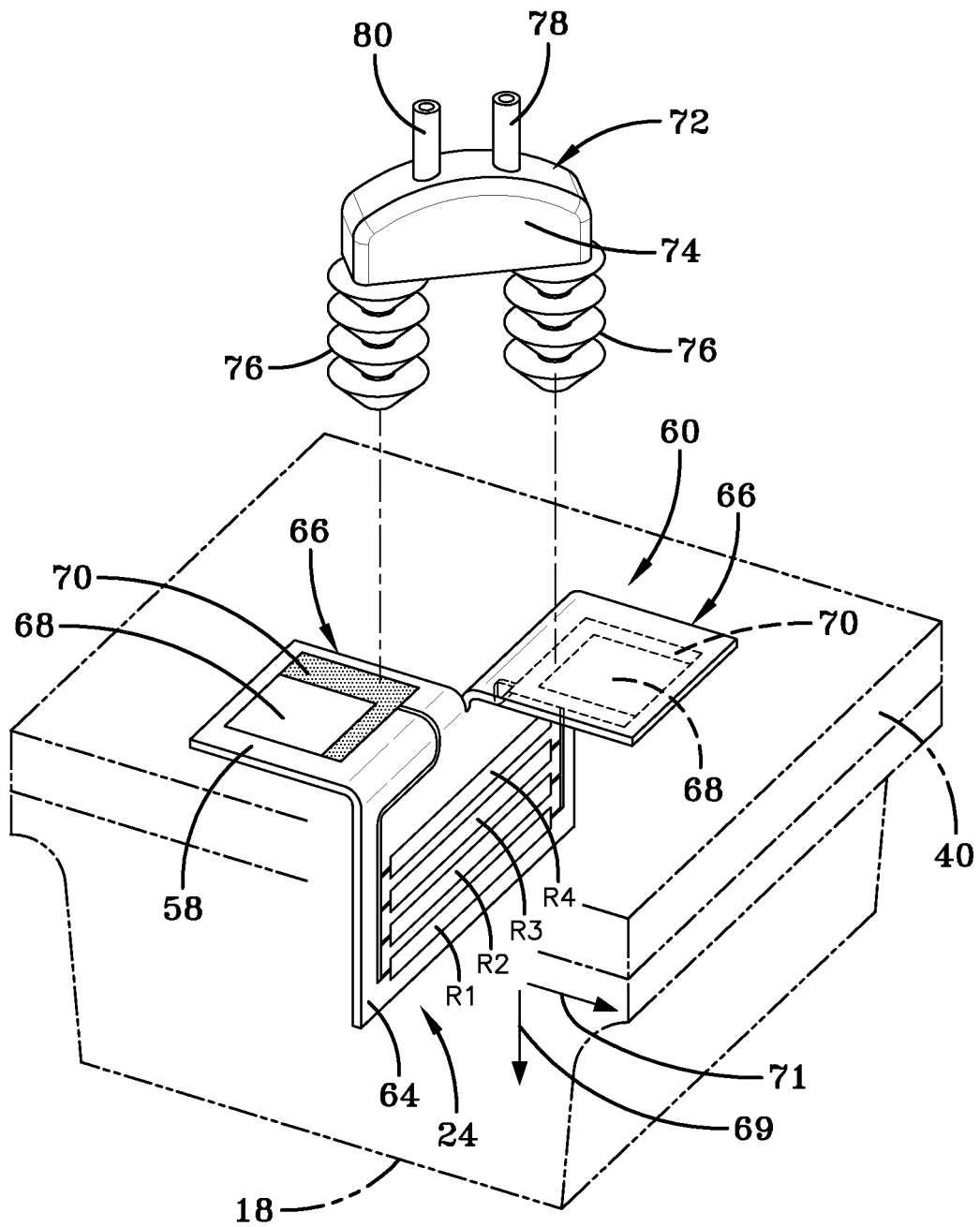
FIG. 9 is a perspective view of a Flip-Flop sensor in a tread block and a plug-in connector.
Figure 10:
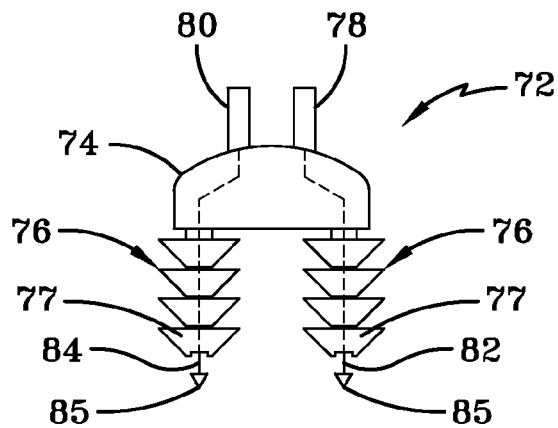
FIG. 10 is a plan view of a thru-belt connector.
Figure 11A:
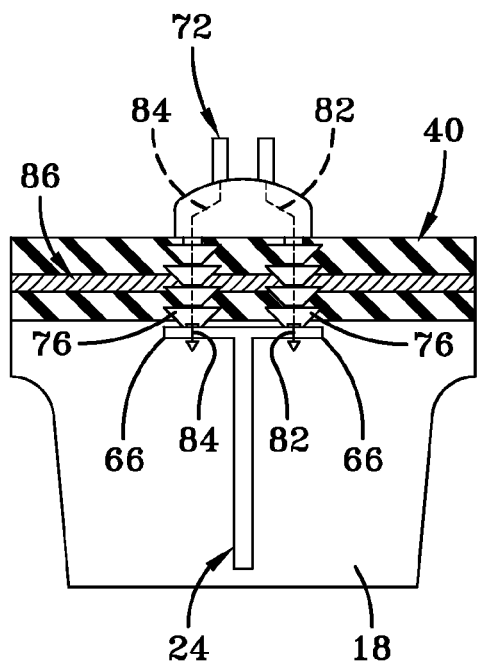
FIG. 11A is a section view of a tread block showing a flip-flop sensor and thru-belt connector.

With continued reference to FIGS. 9, 10 and 11A, a plug-in needle-style connector 72 is provided to establish interconnection between a TPMS module and the lug-mounted flip-flop contacts 60 of the wear sensor 24. The connector 72 is operative as a through-belt connector which penetrates a tire carcass from the internal cavity side to establish electrical connection with the contact pads 68 of the flip-flop wings 66. The connector 72 includes a housing 74 having projecting wall plug-style probe fingers 76 for penetrating through the tire carcass from the cavity side. The fingers 76 are provided with an axial array of piercing arrowhead flanges beveled in an orientation which assists in achieving the intended carcass penetration. Extending into the housing 74 from the TPMS module (unshown) are leads 78, 80 coupled respectively to inside conductors 82, 84. The inside conductors extend through a respective one of the punch-in fingers 76 to terminate at a punch-in head 85. The length of the punch-in fingers 76 is sufficient to span the distance between the tire inside cavity and the contact pads of the lug-mounted sensor 24. The array of arrow-head configured piercing flanges 77 extend along each of the fingers 76 to deter disengagement of the connector 72 from the tire carcass after the fingers 76 have penetrated the tire carcass and engaged with the flip-flop contact pads.

Figure 11B:
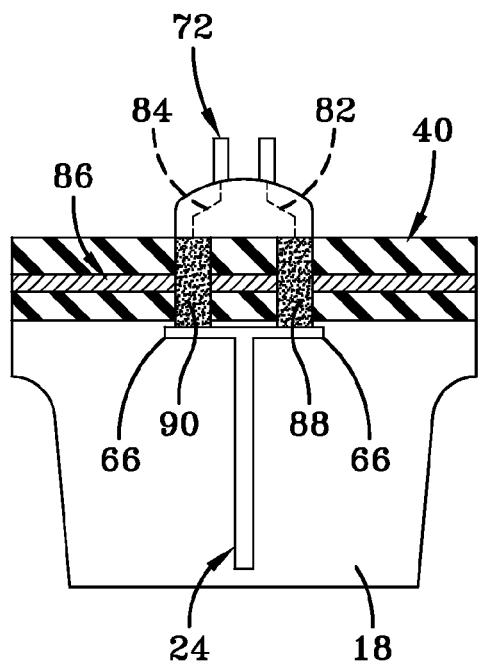
FIG. 11B is a section view of a tread block showing a flip-flop sensor and a conduction chimney connector alternative embodiment.

From FIG. 9, it will be appreciated that housing 72 is oriented during an attachment sequence to the tire carcass so as to align with the flip-flop contact pads 60 on the wings 66. The distance between the penetrating fingers 76 of connector 72 is such that the fingers 76, once suitably located and punched through the tire carcass, will encounter and engage the contacts 60 on each of the flip-flop wings 66. The plug fingers 76 have a length approximately 3 mm. Electrical connectivity is thereby established and maintained between the contacts 60, the inside conductors 82, 84 and the leads 78, 80 extending to a data transmitting device such as one integrated into a tire-mounted TPMS module. The flip-flop connector wings 66 serve to maximize the "blind" contact area targeted by the punch-through connector 72. The connector 72 is added in a post-cure procedure Referring to FIGS. 11B, an alternative means of interconnectivity between wear sensor 24 and a remote data transmitting device is shown. The plug-in needle connector 72 utilizes conduction chimneys 88, 90 in the alternative embodiment to interconnect housing leads 82, 84 to appropriate flip-flop contact pads carried by contact wings 66. The conduction chimneys 88, 90 are formed from anisotropic conducting adhesives that fill through-passageways punched through the tire carcass belt construction. The leads 82, 84 are electrically coupled to the conduction chimneys 88, 90 and are thereby connected to the contact pads of the wear sensor 24.

Figure 12:
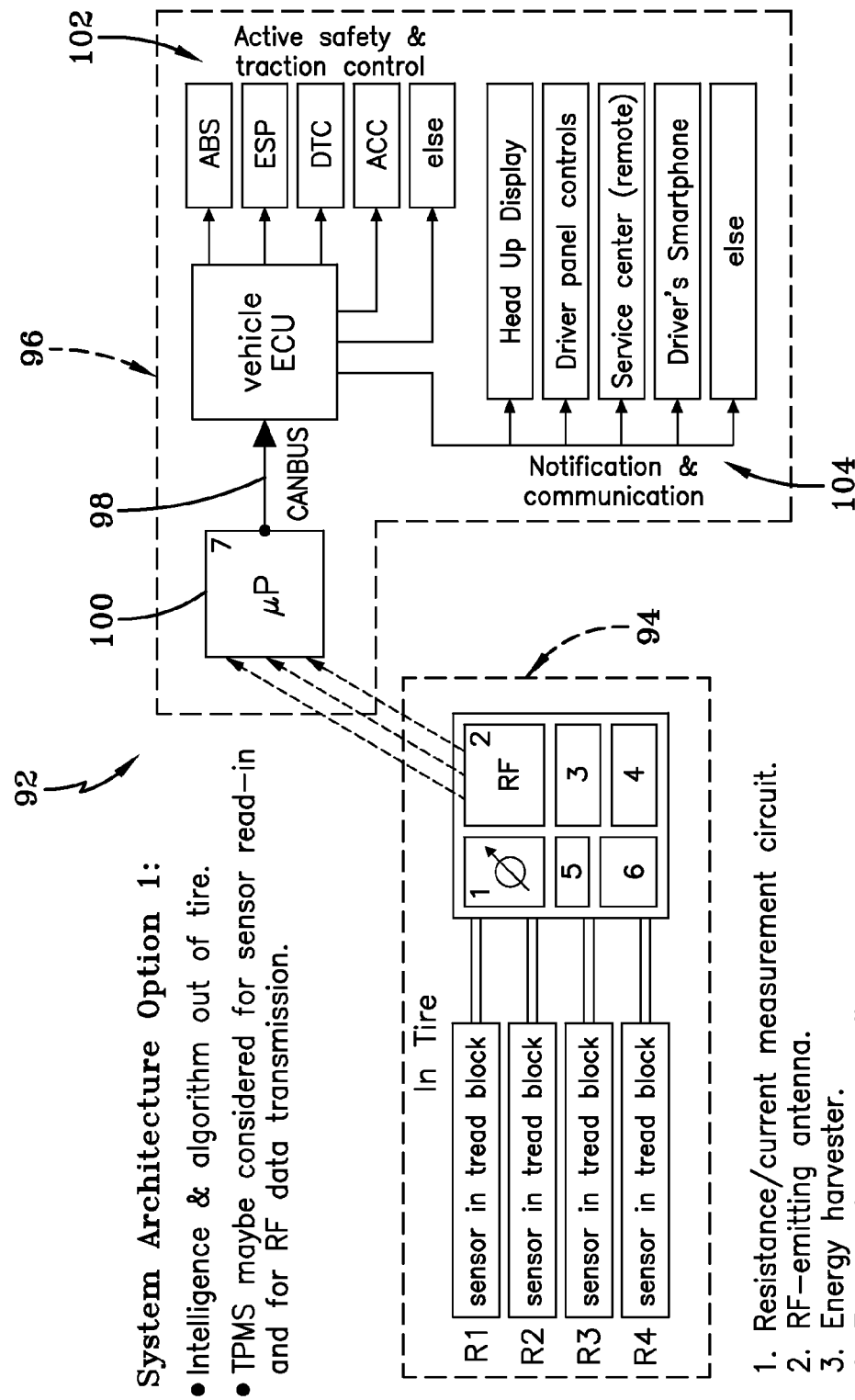
FIG. 12 is a diagram of first System Architecture embodiment.

A first system architecture 92 which utilizes tread wear measurement is depicted schematically in FIG. 12. In the system 92 the intelligence and algorithm for data processing is located out of the tire. A TPMS system may be utilized for sensor read-in and for RF data transmission from the wear sensor. Alternatively, a dedicated wear sensor input device and data transmitter device from the wear sensor may be employed if desired. The in-tire architecture 94 in the system architecture 92 includes the sensor resistor elements R1, R2, R3, R4; the resistance/current measurement circuit; an RF-emitting antenna; an energy harvester; an energy storage capacitor; a current rectifier circuit; and a sensor read-out circuit. Transmission of resistance measurements is made by RF signal to an In-Vehicle system 96 which includes a receiver and microprocessor unit 100. The microprocessor 100 transmits an output reflecting tire wear via the vehicle CANBUS 98 to the vehicle Electronic Control Unit (ECU). The vehicle ECU may then use the tire wear status in active safety and traction control systems such as an anti-lock brake system (ABS); an electronic stability program control system (ESP); direct traction control system (DTC); adaptive cruise control system (ACC); etc.

The process of wear estimating by measuring the resistance change in the resistance/current measurement circuit may be adjusted and optimized through the selection of differentiated individual sensor resistances (i.e. R1 through R4 have different resistances). Sensor interconnection (serial vs. parallel) may further be selected to make the measurement of resistance change in reading and algorithmic functions simplified.

The vehicle ECU may further output notification communication 104 to a vehicle operator. Such notification may take multiple forms such as a head up display; driver panel controls; service center information transmittal remote to the vehicle; a driver smartphone, etc.

Figure 13:
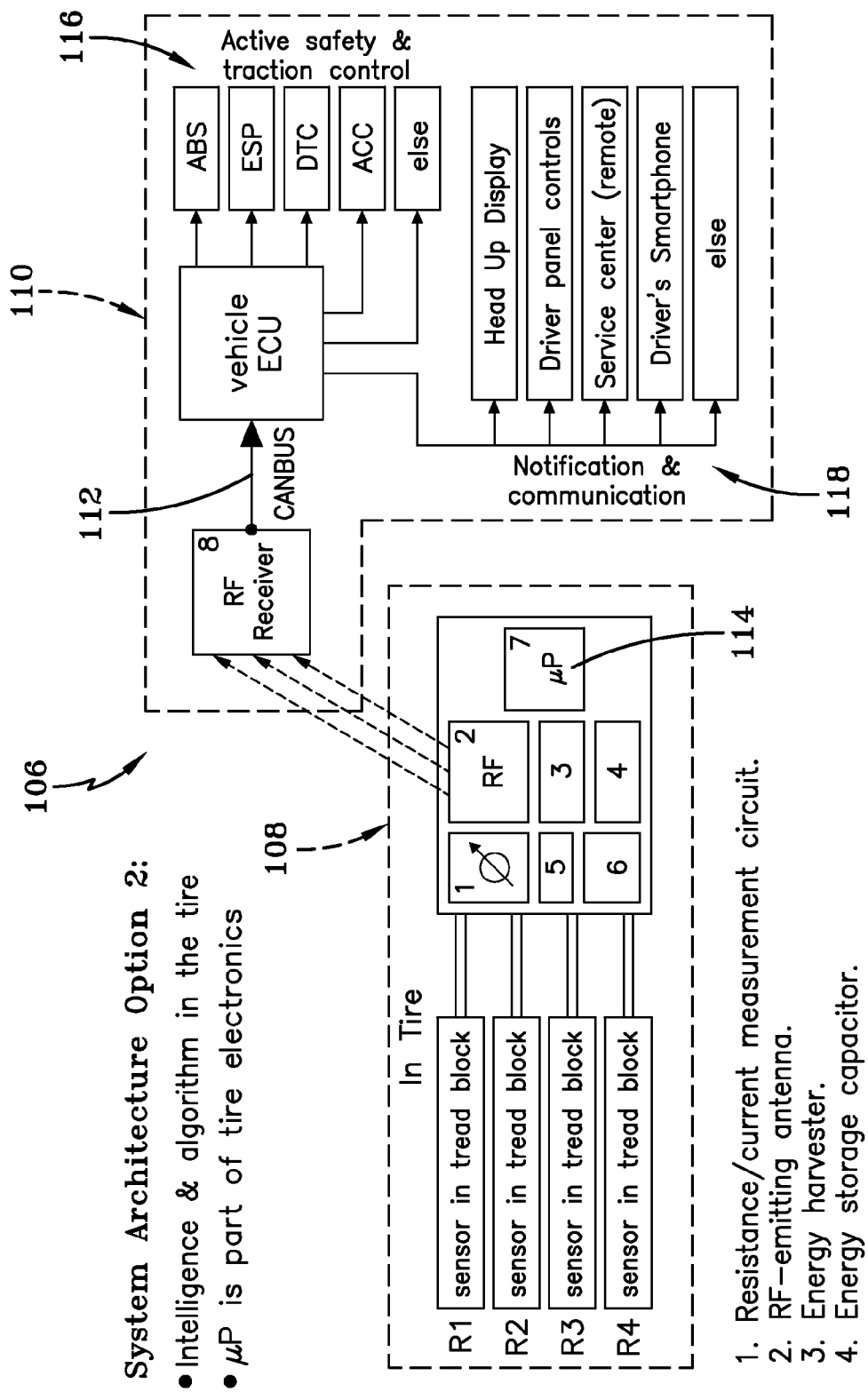
FIG. 13 is a diagram of second alternative System Architecture embodiment.

An alternative system architecture 106 is shown schematically in FIG. 13. In the alternative system, the microprocessor 114 is incorporated as part of the in-tire 108 electronics rather than part of the in-vehicle 110 system. The microprocessor is programmed with a wear estimation algorithm that uses the resistance change within the resistance/current measurement circuit to derive tread wear status. An energy harvester is provided to power the in-tire electronics. The energy harvester may be piezo-based, electroactive polymer-based, or constitute a battery. The tread, as described previously and shown in FIGS. 2A and 2B, has multiple tread lugs equipped with a wear sensor 24. By monitoring and measuring the wear of multiple tread lugs situated at different locations across the tread, a general conclusion as to tread wear may be derived. The microprocessor 114 in the second embodiment analyzes data from each sensor 24 and transmits by RF signal tread wear data to an in-vehicle receiver. As with the embodiment of FIG. 12, the second embodiment architecture of FIG. 13 communicates tread wear information by the vehicle CAN-BUS 112 to the vehicle ECU which then employs tread wear in an array of active safety and traction control systems 116. As with the architecture embodiment of FIG. 12, the vehicle ECU may further output notification communication to a vehicle operator in an array of communication options 118. Such notification may take multiple forms such as a head up display; driver panel controls; service center information transmittal remote to the vehicle; a driver smartphone, etc.

Figure 14A:
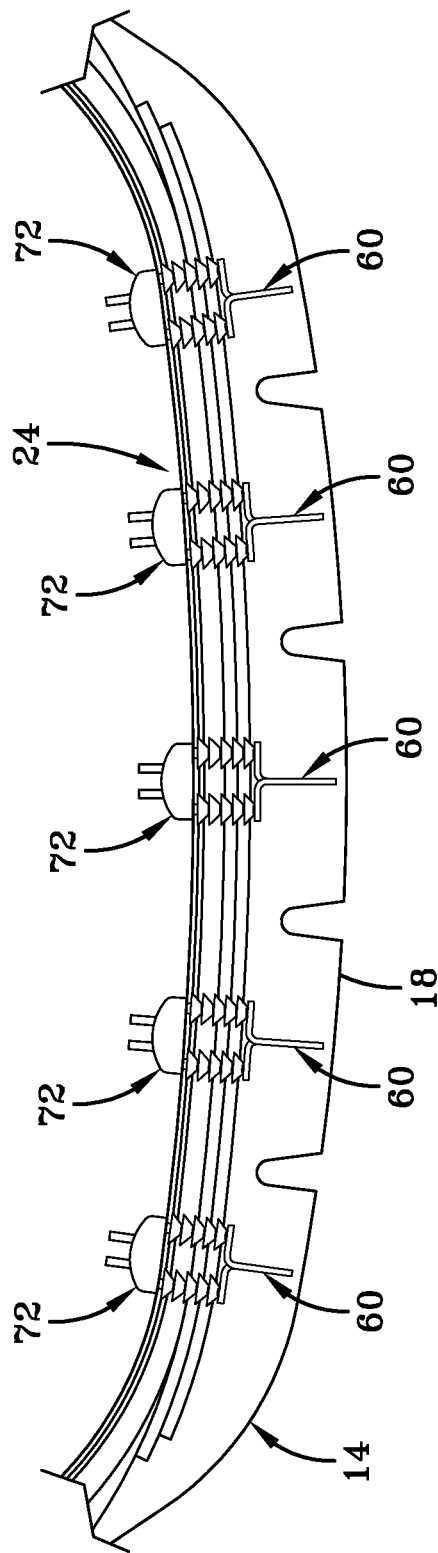
FIG. 14A is an enlarged section view of a tread area showing sensors and thru-belt connector placed in full row of lugs.

FIG. 14A shows an enlarged section view of a tread area showing sensors 24 employing flip-flop configured contacts 20 attached in full row of tread lugs 18. The thru-belt connectors 72 extend through the tire contact to engage and establish electrical contact with the contacts 60 of the sensors 24 as described previously.

Figure 14B:
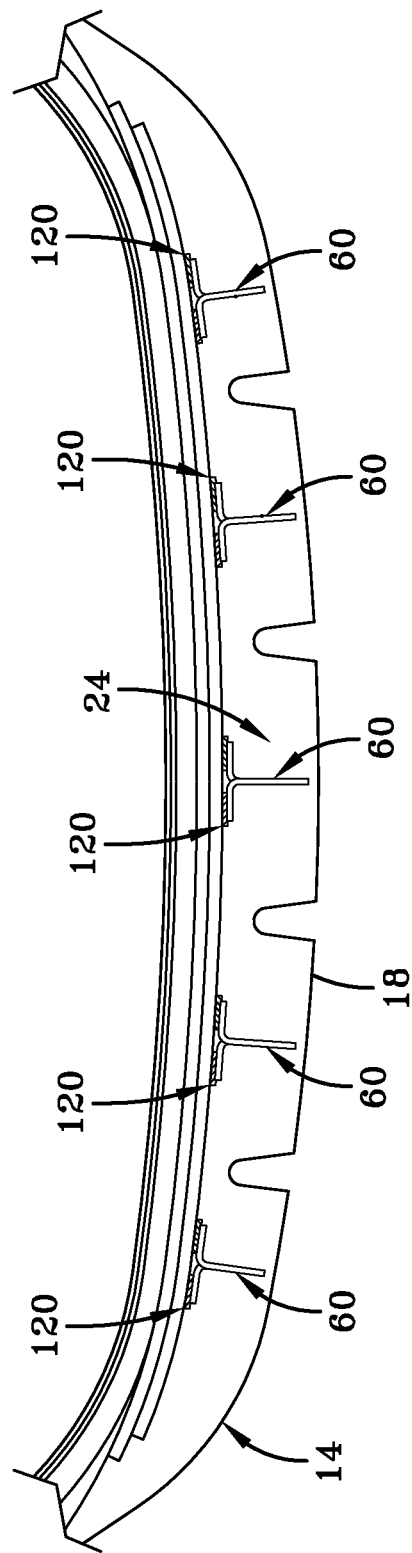
FIG. 14B is an enlarged section view of a tread area showing sensors placed on conducting adhesive strips.

FIG. 14B shows by enlarged section view a tread area in which the flip-flop contacts 60 of the sensors 24 are placed on anisotropic conducting adhesive strips or tape 120. Engagement of the thru-belt connectors (not shown) is with the anisotropic tapes 120.

Figure 15A:
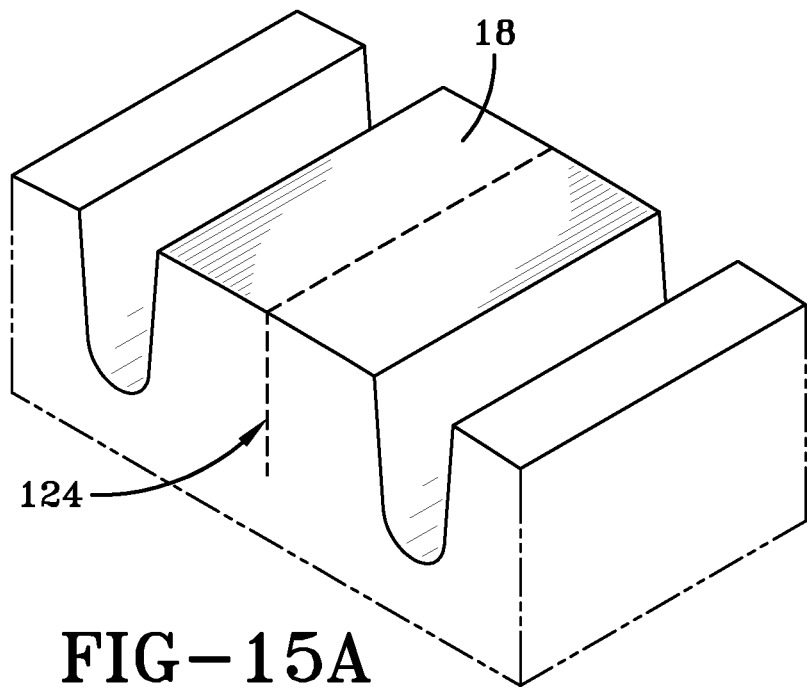
FIGS. 15A and 15B are perspective views of an alternative embodiment showing lug center cutting and a sensor being etched directly onto inside area of lug using liquid ink jet printing.
Figure 15B:
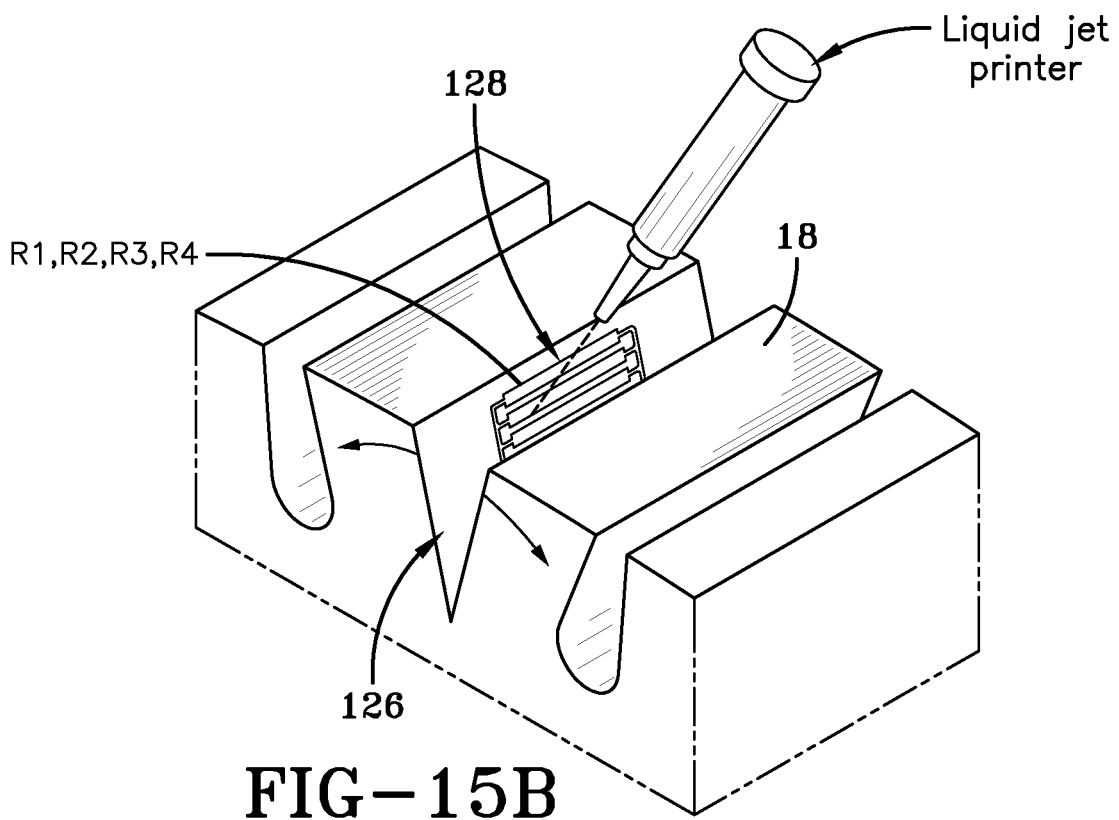
Figure 16A:
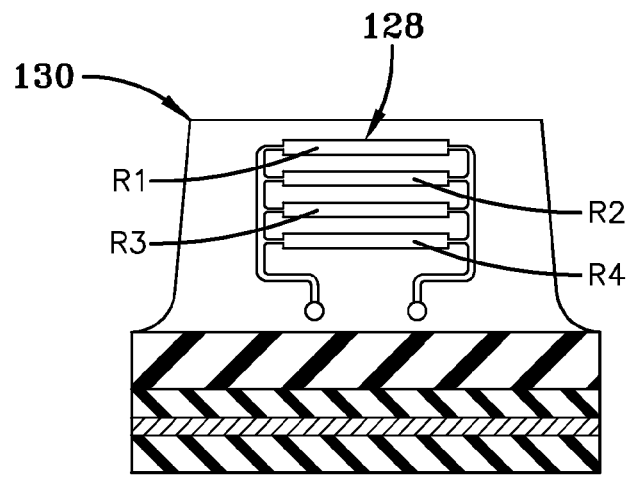
FIG. 16A is a section view showing an ink jet pattern on a cut tread block surface.
Figures 16B, 16C:
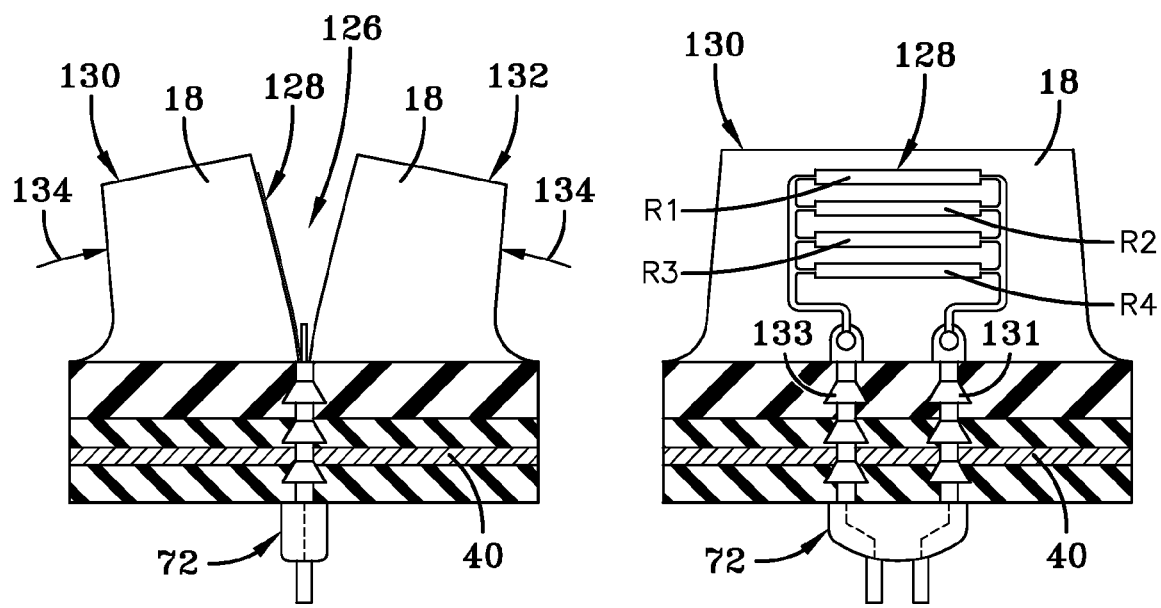
FIG. 16B is a section view showing an etched tread block inside surface and thru-belt connector in place before closing.
FIG. 16C is a section view showing a finished etched sensor and connection to thru-belt connector.

In FIGS. 15A and 15B, perspective views of an alternative embodiment is shown in which the center of a tread block 18 is cut in preparation for attachment of the wear sensor by a radially extending cut line 124 into the lug 18. The bifurcated lug 18 is separated forming a V-shaped channel 126. A sensor half 128 is then etched directly onto inside area of lug 18 using a suitable process such as liquid ink jet printing. FIG. 16A shows in section view the ink jet pattern on a cut tread block surface of a left half of the block 18. In FIG. 16B the plug-in needle connector 72 is inserted through the carcass from the tire cavity side as described previously, with contact probes 131, 133 positioned within the V-shaped channel 126 opposite terminal ends of the etched sensor circuit 62. As shown in FIG. 16B by directional arrows 134, the bifurcated block halves 130, 132 are then closed together to eliminate the channel 126 and bring the contact probes 131, 133 into contacting electrical engagement with the terminal ends of the etched circuit 128. FIG. 16C shows in section the finished etched sensor and connection to the thru-belt connector.

Figure 17A:
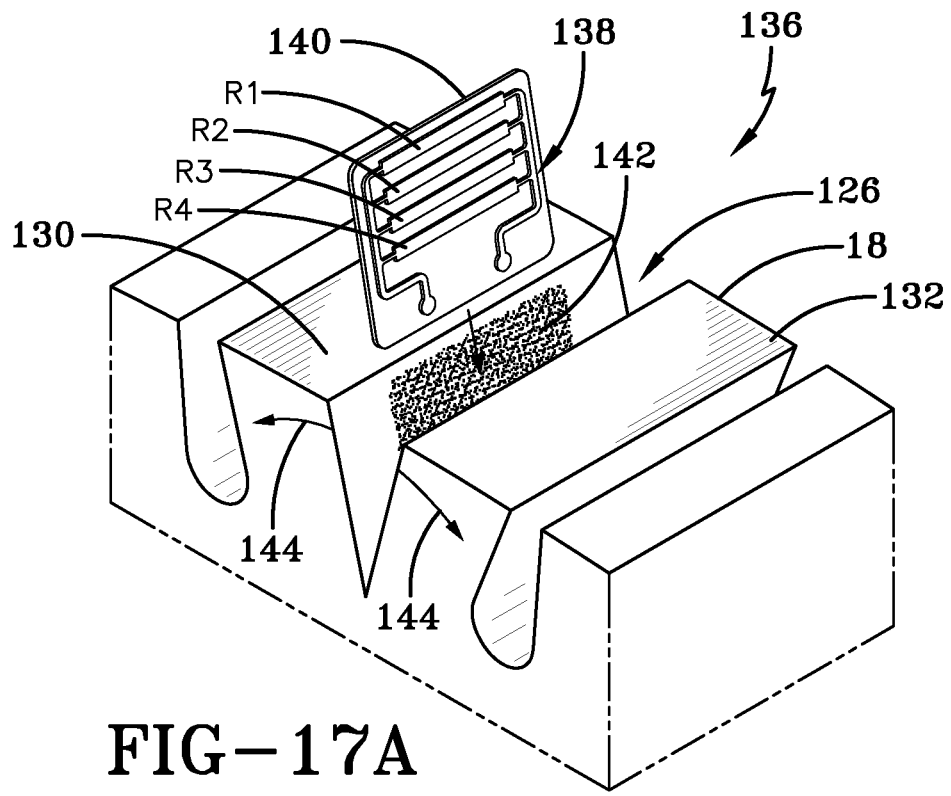
FIG. 17A is a perspective view of a cut tread block with etched conductor being placed directly to an inside surface.
Figure 17B:
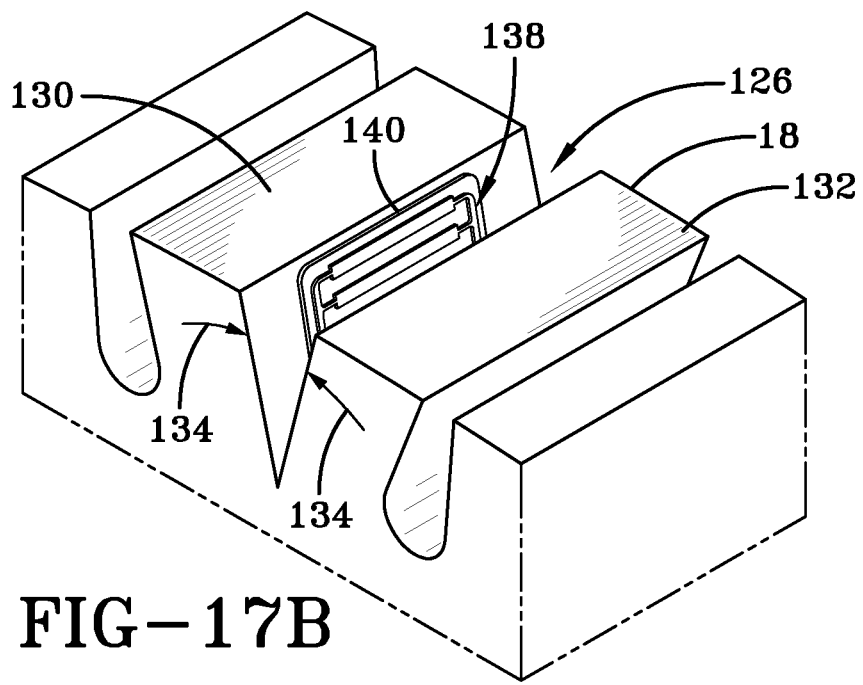
FIG. 17B is a perspective view of an etched conductor fully placed in a cut tread block.

FIG. 17A is a perspective view of the cut tread block 18 receiving a separately-formed etched circuit 138 as an alternatively to etching the circuit directly to the tread lug. The etched circuit 138 is applied to a strip of suitable material such as flexible polymer film 140. The polymer film 140 is then attached to an inside surface of the lug formed facing the cut V-shaped channel 126. An adhesive 142 is pre-applied to the channel-facing surface of the lug 18 operative to adhere the film 140 carrying etched sensor 138 to the lug surface. The through-belt connector is then attached (not shown) in a similar manner to that shown in FIG. 16C to complete the circuit to tread lug sensor interconnection. The lug 18 is then closed as indicated by arrows 144.

From the foregoing, it will be appreciated that the sensor 24 to a host lug 18 may be achieved in alternative procedures. The FIGS. 16A through C procedure etches the circuit directly to a bifurcated lug surface once the lug is separated. The FIG. 17A and B approach is to pre-form an etched circuit to a carrier polymer strip which is then assembled to the lug by use of an adhesive. In either assembly process, the completed resistive sensor circuit is at its intended location within the tread lug, oriented to progressively wear as the tread lug wears. The through-belt connector extends from the cavity side of the tire carcass through the belt assembly to establish and maintain a positive mechanical and electrical engagement with the sensor contact pads. A flip-flop contact configuration for the sensor operates to increase the target area and facilitates alignment of the through-belt connector probes with the target contact regions.

Tread wear device assembly includes a tread wear indicator affixed to one or more tire tread elements. The indicator(s) is constructed as a plurality of radially stacked sensor elements operatively configured and located to sequentially sacrificially abrade and change in electrical resistance responsive to a progressive tread wear of the tread element to which the sensor element is affixed. The sensor elements are connected by circuitry that communicates a data signal from the sensor elements to a data processor indicative of a change in resistivity of the sensor elements. The data processor receives the data signal from the sensor elements and determines a radial wear level of the tread element(s) based on the data signal.

One, and preferably multiple, sensors 24 are mounted to a respective tread lug in a pre-determined pattern across the tread. The resistive element(s) integrated into circuitry of sensors 24 are operatively subjected to a progressive etching induced by the tread wear of the respective tread element, whereby producing a measureable change in sensor resistivity. Each sensor 24 is targeted by a plug-in needle connector 72 operative to protrude through the tire carcass 22 from a cavity 20 side of the carcass to engage and establish an electrical contact with the sensor elements R1 through R4.

Multiple tread wear indicators or sensors 24 are affixed over the tire tread, each indicator at a respective tread location and each mounted to a respective tread element. Each tread wear indicator 24 is constructed having radially stacked sensor elements R1 through R4 that sequentially sacrificially abrade and change in resistivity as the respective host tread lug progressively wears. The plug-in needle connectors 72 protrude through the carcass from a tire cavity side of the carcass and establish a positive mechanical and electrical contacting engagement with respective sensors 24 and the electrical interface contact pads thereof. Alternative architectures of the system, shown by FIGS. 12 and 13, evaluate the change in electrical resistance of the sensors 24 cause by tread lug wear and thereby determine the status of lug wear. Such information is communicated from the sensors 24 to a processing unit. The status of tread wear may then be used by vehicle safety and handling systems. Information concerning tread wear status may further be communicated to a vehicle operator.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of installing a tread wear sensor in a tire of the tire type comprising a tire carcass enclosing a tire cavity and a tire tread region on the a radially outward regions of the tire carcass, the tire further having a plurality of tread elements projecting from a base of the tire tread region, the method comprising:

configuring a tread wear indicator to include at least one sacrificial resistive sensor element having a known resistance value;

affixing the at least one resistive sensor element of the tread wear indicator to a selected tread element in a sensor element orientation placing the sensor element substantially parallel to a ground engaging surface of the tread element at a known sensor depth from the ground engaging surface; the at least one sensor element operative to sacrificially abrade and change in resistance responsive to progressive tread wear on the one tread element to the sensor depth;

positioning a connector assembly within the tire carcass cavity radially opposite the one resistive sensor element; and inserting a needle projection of the connector assembly through the tire carcass radially outward from a tire cavity side, the needle projection extending to a position opposite the one resistive sensor element, and the connector assembly carrying conductive leads operative to engage and establish electrical contact with the one resistive sensor element;

measuring a change in resistivity in the one sensor element;

determining tread wear status of the one selected tread element based on the measured change in resistivity of the one sensor element.

2. The method of claim 1, wherein further comprising:
configuring the tread wear indicator to include a plurality of the resistive sensor elements arranged in a stack; and
affixing the stack of resistive sensor elements to the one tread element operative to place the plurality of resistive sensor elements in the stack parallel to the ground engaging surface of the tread element at respective sensor depths from the ground engaging surface of the one tread element; the plurality of resistive sensor elements operative to sequentially sacrificially abrade responsive to progressive tread wear on the one tread element to the respective sensor depths of the resistive sensor elements.

3. The method of claim 2, wherein further comprising:
transmitting a data signal from the resistive sensor element indicative of a change in resistivity of at least one of the sensor elements; and
processing the data signal to determine a radial wear level of the selected tread element based on the data signal.

4. The method of claim 3, wherein further comprising:
deploying a plurality of the tread wear indicators affixed respectively to a plurality of selected tread elements dispersed at axial locations across the tread region, each tread wear indicator comprising a plurality of resistive sensor elements; and
transmitting change in resistivity data in the resistive sensor elements in the plurality of tread wear indicators responsive to a tread wear in the plurality of selected tread elements.

5. The method of claim 3, further comprising mutually differentiating the resistivity of the plurality of resistive sensor elements in each tread wear indicator.

6. The method of claim 3, further comprising:
dividing the one tread element into opposed tread element blocks by an axially extending incision;
spreading the opposed tread element blocks apart;
affixing the stack of resistive sensor elements to a channel-facing surface of a first tread element block; and
converging the tread element blocks together to substantially eliminate the channel.

7. The method of claim 6, further comprising:
etching a circuit including the stack of resistive sensor elements onto a substrate;
affixing the substrate carrying the circuit to the channel-facing surface of the first tread element block by means of an adhesive.

8. The method of claim 6, further comprising etching a circuit including the stack of resistive sensor elements on the first tread element block channel-facing surface.

9. A method of installing a tread wear sensor in a tire of the tire type comprising a tire carcass enclosing a tire cavity and a tire tread region on the a radially outward regions of the tire carcass, the tire further having a plurality of tread elements projecting from a base of the tire tread region, the method comprising:

configuring a tread wear indicator to include a plurality of stacked resistive sensor elements, each having a known resistance value;

dividing a one tread element into opposed tread element blocks by an axially extending incision;

spreading the opposed tread element blocks apart;

affixing the stack of resistive sensor elements to a channel-facing surface of a first tread element block in an orientation wherein each sensor element is parallel to a ground engaging surface of the tread element at a known sensor depth from the ground engaging surface;

converging the tread element blocks together to substantially eliminate the channel;

positioning a connector assembly within the tire carcass cavity radially opposite the stack of resistive tread elements; and inserting a needle projection of the connector assembly through the tire carcass radially outward from a tire cavity side, the needle projection extending to a position opposite the stack of resistive sensor elements, and the connector assembly further carrying conductive leads operative to engage and establish electrical contact with the stack of resistive sensor elements.

10. A method of installing a tread wear sensor in a tire of the tire type comprising a tire carcass enclosing a tire cavity and a tire tread region on a radially outward region of the tire carcass, the tire further having a plurality of tread elements projecting from a base of the tire tread region, the method comprising:

configuring a plurality of tread wear indicators to include respectively at least one sacrificial resistive sensor element having a known resistance value;

affixing the at least one resistive sensor element of the plurality of tread wear indicators to respective selected tread elements positioned at dispersed axial locations across the tread region;

placing each one resistive sensor element in an orientation wherein the sensor element is substantially parallel to a ground engaging surface of the respective tread element at a known sensor depth from the ground engaging surface; the at least one sensor element operative to sacrificially abrade and change in resistance responsive to progressive tread wear on the respective tread element;

positioning a plurality of connector assemblies within the tire carcass cavity radially opposite each of the selected tread elements; and inserting a plurality of needle projections from each of the connector assemblies radially outward through the tire carcass from a tire cavity side, the needle projections extending to positions opposite a respective one resistive sensor element, and each of the needle projections carrying conductive leads operative to engage and establish electrical contact with the respective one resistive sensor element;

measuring a change in resistivity in the one sensor element of each of the plurality of tread wear indicators;

determining a tread wear status profile based on the measured change in resistivity of the one sensor element of each of the plurality of tread wear indicators.

11. The method of claim 10, further comprising:

configuring the plurality of tread wear indicators to each include a plurality of the resistive sensor elements arranged in a stack; and affixing the plurality of resistive sensor elements of each tread wear indicator to a respective tread element parallel to the ground engaging surface of the respective tread element at respective sensor depths from the ground engaging surface of the respective tread element; the plurality of resistive sensor elements operative to sequentially sacrificially abrade responsive to progressive tread wear on the respective tread element to the respective sensor depths of the resistive sensor elements.

12. The method of claim 11, further comprising mutually differentiating the resistivity between the plurality of resistive sensor elements in each stack.

13. The method of claim 11, further comprising:

dividing each of the plurality of tread elements into opposed tread element blocks by an axially extending incision;

spreading the opposed tread element blocks of each of the plurality of tread elements apart;

affixing a stack of the resistive sensor elements to a channel-facing surface of a respective tread element block; and converging the tread element blocks together to substantially eliminate the channel therebetween.

14. The method of claim 13, further comprising:

etching a circuit including a stack of resistive sensor elements onto a substrate for each of the tread wear indicators; and affixing the substrates to a channel-facing surface of a respective tread element block by means of an adhesive.

15. The method of claim 13, further comprising etching a circuit including a stack of resistive sensor elements on a channel-facing surface of a respective tread element block.

* * * * *